United States Patent

[11] 3,523,497

| [72] | Inventor | Werner Holle |
| | | Wetzlar, Germany |
| [21] | Appl. No. | 645,441 |
| [22] | Filed | June 12, 1967 |
| [45] | Patented | Aug. 11, 1970 |
| [73] | Assignee | Ernst Leitz G.m.b.H. |
| | | Wetzlar, Germany |
| [32] | Priority | June 16, 1966 |
| [33] | | Germany |
| [31] | | No. L53,857 |

[54] CAMERA LIGHT METER
1 Claim, 1 Drawing Fig.
[52] U.S. Cl.................................................... 95/42,
95/10
[51] Int. Cl....................................................... G03b 19/12
[50] Field of Search............................................ 95/42

[56] References Cited
UNITED STATES PATENTS

| 3,127,809 | 4/1964 | Denk.................................. | 95/42X |
| 3,332,330 | 7/1967 | Broschke et al.................. | 95/42 |
| 3,332,331 | 7/1967 | Mandler........................... | 95/42 |

*Primary Examiner*— Norton Ansher
*Assistant Examiner*— Richard L. Moses
*Attorney*—Spencer and Kaye ABSTRACT: In a behind-the-lens light meter system for a reflex camera, which system includes a concave mirror disposed behind a planar beam-splitting mirror, a light-sensitive element is disposed at the focal plane of the concave mirror for producing a maximum light concentration at the light-sensitive element. With this arrangement the image of the front focal point, or principal focus on the subject side of the camera lens system will be focused on the light-sensitive element instead of the subject image being focused at the plane of the light-sensitive element as described in the prior art.

Patented Aug. 11, 1970
3,523,497
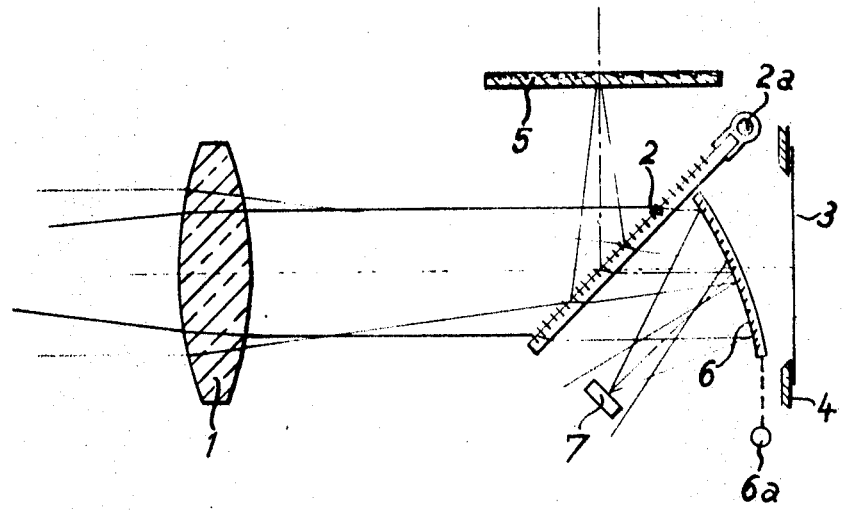
Inventor:
Werner Holle
By: Spencer & Kaye
Attorneys ns with interchangeable lenses. As a result, the angle of view of the light-sensitive element will be the same as that of the camera lens system for the portion of the picture area which is read by the light-measuring system.

CAMERA LIGHT METER

BACKGROUND OF THE INVENTION

The present invention relates to cameras, and more particularly to a light meter arrangement for a single-lens reflex camera, especially a camera which is equipped with a plurality of interchangeable objective lenses.

As is well known in the art, the exposure time for a photograph is best determined by measuring the light through the objective lens, inasmuch as this inherently takes into consideration the angular field picked up by the lens, and there exist single-lens reflex cameras in which the hinged mirror, i.e., the mirror which is pivotable into and out of an operative position in which it lies between the objective lens and the film and in which it reflects the light coming through the objective lens onto a focussing screen, such as a ground glass plate, is fashioned as a beam splitter, with so much of the light which passes through the mirror being used for measuring the light.

It has already been suggested, for example in Application Serial No. 478,068, filed on August 9th, 1965, by Heinrich Broschke, Werner Holle, Gunther Meinecke and Erich Mandler, now U. S. Patent No. 3,332,330 issued on July 25th, 1967, to provide a light meter arrangement for a single-lens reflex camera having objective lens means and finder means, which light meter arrangement comprises a light-sensitive element and means which form a partly reflective light beam divider component arranged in the path of the light rays coming through the objective lens means and going to the finder means and a concave mirror component for reflecting, onto the light-sensitive element, light which, as the result of the beam division, is taken out of the path of the light rays going to the finder means. The two components may either be constituted by the same physical entity, or they may be two physically distinct entities. The radius of curvature of the concave mirror component, and the distance between it and the light-sensitive element, are such that any light beam that transmits the image of the light-sensitive element into the space occupied by the objective lens means does not intersect the exit pupil of the objective lens means.

It is known that, particularly in the case of reflex cameras having behind-the-lens metering systems, the proportion of light transmitted to the light-sensitive element is very small. This is true because the requirement that a certain portion of the light passing through the camera lens system be reflected to the view finder causes the efficiency with which light through the lens system is transmitted to the light-sensitive element to be very poor.

SUMMARY OF THE INVENTION

It is a primary object of the present invention to overcome these drawbacks and difficulties.

Another object of the present invention is to improve the efficiency with which the light transmitted to the light-sensitive surface of a light meter element is utilized.

Another object according to the present invention is to increase the light concentration at the light-sensitive surface of the meter element.

Another object of the present invention is to increase the accuracy of the light reading obtained by such an element.

It has been found that an improved light reading can be obtained by making the light-sensitive surface of the meter element smaller than the cross-sectional area of the portion of the photographic image reflected by the concave mirror of devices of this type disclosed in the above-cited application. By thus reducing the size of this surface and causing all of the light from the concave mirror to be concentrated at this surface, it is possible to substantially increase the light intensity incident on the light-sensitive surface.

If the light-sensitive element is constituted by an inter-nested double photo resistor, of a type known per se, it is necessary to prevent a reproduction on th light-sensitive surface of the subject to be photographed. For each image point, there must be provided, on this light-sensitive surface a scattering circle whose dimension is greater than twice the electrode distance in order to assure that an accurate measurement will be obtained.

The above requirements and objects are achieved, according to the present invention, by the provision, in a light meter device for reflex cameras, which device includes a light-sensitive element, a partly reflective beam-splitting mirror for reflecting a portion of the light passing through the camera lens toward the camera view finder, and a concave mirror positioned to reflect the light rays passing through the beam-splitting mirror onto the light-sensitive element, of the improvement wherein the light-sensitive element is positioned substantially at the focal plane of the concave mirror to be spaced from the mirror by a distance about equal to one-half the radius of curvature of the mirror.

It has been found that this arrangement, in addition to permitting a maximum concentration of the light directed toward the light-sensitive element, has the effect of causing the front, or subject, focal point, or principal focus on the subject side, of the camera lens system to be reproduced on the light-sensitive element, this being true for each lens system in a camera having interchangeable lenses. As a result, the angle of view of the light-sensitive element will be the same as that of the camera lens system for the portion of the picture area which is read by the light-measuring system.

BRIEF DESCRIPTION OF THE DRAWING

The single FIGURE of the drawing is a schematic elevation of a preferred embodiment of the present invention.

DESCRIPTION OF THE PREFERRED EMBODIMENTS

Referring to the single drawing FIGURE, the same shows one embodiment of a portion of a single-lens reflex camera having a light-measuring system constructed according to the present invention. The arrangement illustrated includes an objective lens 1 through which the light beam enters the camera from the outside, and a hinged mirror 2 which itself is a partial mirror, i.e., a mirror which is provided with a mirror coating that is partly light-permeable so as to enable the mirror to serve as a beam splitter. This is depicted symbolically, in the drawing, by short right-angle lines crossing the surface of the mirror. The mirror 2 is pivotally mounted, in a manner conventional in single-lens reflex cameras, the pivotal mounting being shown schematically at 2a. When the mirror 2 is in the "operative' position shown in FIGURE 1, it reflects part of the light beam coming through the objective lens 1 onto the finder means or focussing screen 5, e.g., a Fresnel lens, thereby to form an image of the object being photographed (not shown) in the focal plane of the focussing screen 5. The film 3 is passed behind a film holder 4 which positions the film 3 in the focal plane.

Arranged between the mirror 2 and the film holder 4 is a concave mirror 6, the full reflecting characteristics of which are depicted, symbolically, by short oblique lines ending at the mirror surface. This concave mirror 6, which may be a Fresnel mirror, reflects onto a light-sensitive element 7, such as a photo-resistor, that portion of the light beam coming through the exit pupil of the objective lens 1 which, as the result of the beam division, is taken out of the path of the light rays going to the screen 5, i.e., that portion of the light which is passed by the partly reflective mirror 2. The mirror 6 itself may be pivotally connected to the mirror 2 or the mirror 6 may be pivotally connected to the camera, as shown at 6a. In either case, the arrangement is such that both the mirror 2 and the mirror 6 can be moved to an inoperative position, i.e., out of the path of a light beam coming from the objective lens and going to the film 3.

According to a principal feature of the present invention, the light-sensitive surface of element 7 is positioned so that its distance from the concave mirror 6 is equal to one-half of the radius of curvature of the mirror 6, so that the light-sensitive surface will be positioned at the focal plane of the mirror with respect to the light beam passing through mirror 2 and striking mirror 6.

It may be noted that the embodiment shown in the FIGURE is similar to that shown in FIGURE 1 of the above-mentioned earlier application, with the exception, that, according to the present invention, the distance of the light-sensitive element 7 from the mirror 6 is different from that illustrated in FIGURE 1 of the above-mentioned application.

It should of course be appreciated that the principle of the present invention can be applied to the other embodiments illustrated in the above-mentioned application.

It will be understood that the above description of the present invention is susceptible to various modifications, changes, and adaptations and the same are intended to be comprehended within the meaning and range of equivalents of the appended claims.

I claim:
1. In a light meter device for a reflex camera equipped with an objective lens forming an image of the subject being photographed on the camera film plane, which device includes a light-sensitive element, a partly reflective beam-splitting mirror disposed behind the camera lens for reflecting a portion of the light passing through the camera lens toward the camera viewfinder, and a concave mirror positioned to reflect the light rays passing through the beam-splitting mirror onto the light-sensitive element, the improvement wherein said light-sensitive element is positioned substantially at the focal plane of said concave mirror, said element being spaced from said concave mirror by a distance about equal to one-half the radius of curvature of said concave mirror.